United States Patent [19]

Anderson

[11] 4,013,147
[45] Mar. 22, 1977

[54] SEGMENTED FRICTION DISC FOR BRAKES

[75] Inventor: Bruce W. Anderson, South Bend, Ind.

[73] Assignee: The Bendix Corporation, South Bend, Ind.

[22] Filed: Sept. 2, 1975

[21] Appl. No.: 609,770

[52] U.S. Cl. .................... 188/218 XL; 192/70.14; 192/107 R

[51] Int. Cl.² ........................................ F16D 65/12

[58] Field of Search ............... 188/73.2, 218 XL; 192/107 R, 70.13, 70.14

[56] References Cited

UNITED STATES PATENTS

| | | | |
|---|---|---|---|
| 3,237,731 | 3/1966 | Du Bois | 188/218 XL |
| 3,650,357 | 3/1972 | Nelson et al. | 188/73.2 X |
| 3,786,904 | 1/1974 | Hotchkiss | 188/218 XL X |
| 3,891,066 | 6/1975 | Anderson | 188/73.2 |

Primary Examiner—George E. A. Halvosa
Attorney, Agent, or Firm—Paul David Schoenle; William N. Antonis

[57] ABSTRACT

An annular rotor defined by a plurality of arcuate segments arranged in end to end relationship to form a friction disc. The arcuate segments are held in relatively loose annular formation by a retaining ring provided with opposite side plates fixedly secured thereto and between which radially extending projections of the arcuate segments extend. Ths side plates are provided with flange or tang portions which mate with recesses formed in opposite sides of the projections to thereby secure the segments to the ring in relatively loose formation to permit thermal expansion of the segments with minimal distortion thereof. If desired, the segments may each be provided with a recess in the unsecured peripheral edge thereof which recesses in aligned form provide a substantially continuous annular recess adapted to receive a flexible ring which, in turn, maintains alignment of the segments in a common plane.

4 Claims, 9 Drawing Figures

SEGMENTED FRICTION DISC FOR BRAKES

BACKGROUND OF THE INVENTION

Various forms of segmented rotor friction discs and, in particular, aircraft disc brakes, wherein retaining means of one form or another for holding the arcuate segments in annular formation against centrifugal forces and adapted to permit a predetermined degree of thermal expansion without undue distortion of the annular disc have been built and used.

Reference is made to U.S. Pat. No. 2,893,519 to J. G. Martin and assigned to the assignee of the present application for an example of one such prior art friction disc. The present invention is an improvement over the disc shown and described in the above-mentioned patent in that machining costs are reduced, material waste is much less and a more compact structural arrangement is provided which, in turn, reduces envelope requirements. The present invention retains the advantages of the above-mentioned prior art friction disc commonly known as a "spider-type disc" which includes position retainment of the arcuate segments under the usual centrifugal and/or frictional forces imposed thereon, segmentation of the rotor disc to allow thermal expansion thereof without distortion, and separation of decoupling of the structural retaining elements from the rotor segments which segments act as a heat sink during frictional engagement of the rotor and stator discs.

SUMMARY OF THE INVENTION

The present invention relates to friction discs of the segmented type and, in particular, to a rotor disc of a multiple disc aircraft brake wherein the rotor disc is defined by a plurality of arcuate segments arranged in annular formation and held in position by a retaining ring engageable therewith and providing a torque transmitting medium between the wheel and rotor disc.

It is an object of the present invention to provide a segmented annular friction disc having a plurality of arcuate segments held in annular formation by a retaining ring provided with segment engaging means and circumferentially spaced apart wheel engaging torque transmitting members.

It is an object of the present invention to provide a segmented annular friction disc having a plurality of arcuate segments held in relatively loose annular formation by retaining means secured to a frictionally unswept portion of the arcuate segments and provided with wheel engaging torque transmitting portions.

Other objects and advantages of the present invention will be apparent from the following description and drawing.

DETAILED DESCRIPTION OF THE INVENTION

Figure 1:
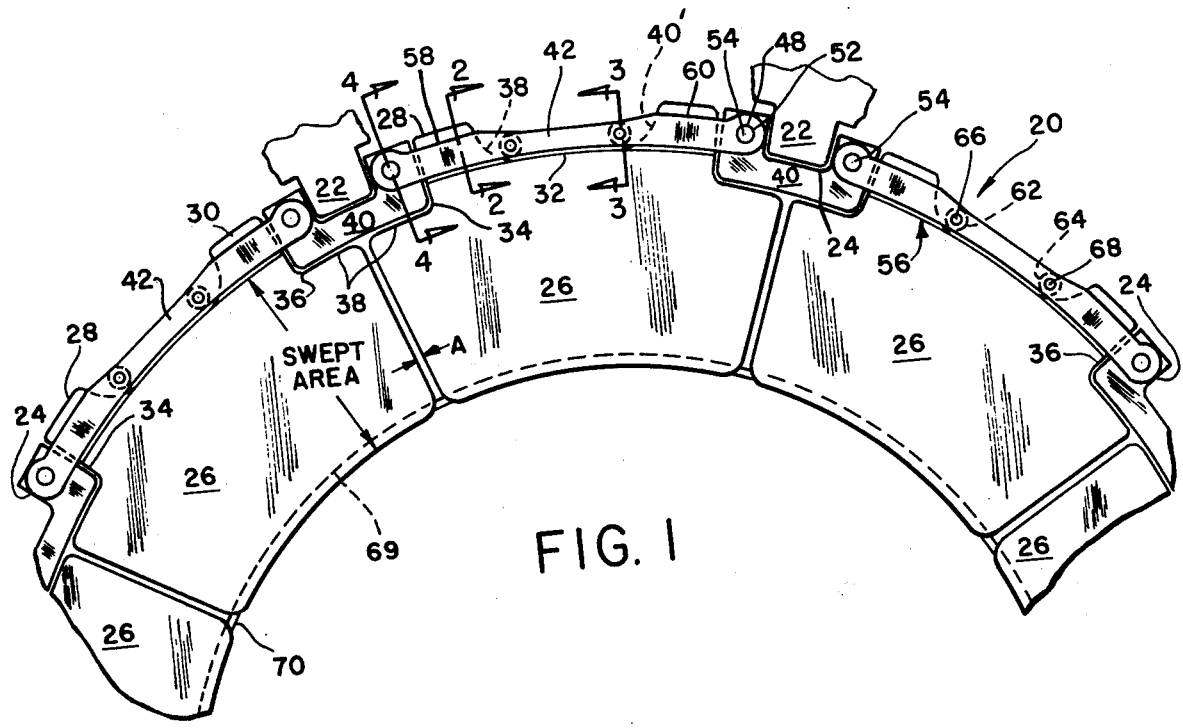
FIG. 1 is a plan view of a portion of an annular brake rotor friction disc embodying the present invention.
Figure 2:
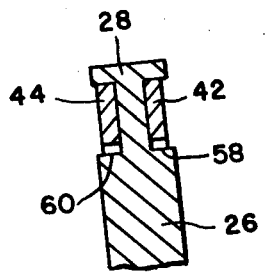
FIG. 2 is a section view taken on line 2—2 of FIG. 1.
Figure 3:
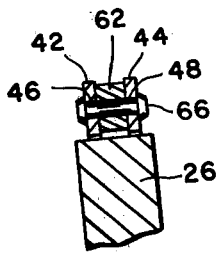
FIG. 3 is a section view taken on line 3—3 of FIG. 1.
Figure 4:
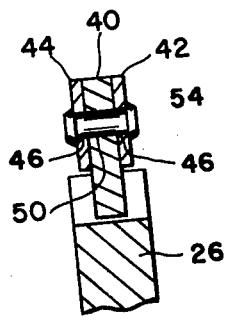
FIG. 4 is a section view taken on line 4—4 of FIG. 1.

Referring to the drawings and, in particular, FIGS. 1 to 4 thereof, numeral 20 designates an annular brake rotor disc connected to rotate with a wheel, not shown, by means of drive mechanism such as a plurality of circumferentially spaced apart key members 22, only two of which are shown, suitably fixedly secured to said wheel, not shown, and axially extending relative thereto. The disc 20 is provided with circumferentially spaced apart slots generally indicated by 24 which slidably mate with key members 22 to provide for axial movement of disc 20 relative to key members 22 while preventing rotational movement of disc 20 relative to key members 22.

The rotor disc 20 includes a plurality of identical arcuate segments 26 arranged end to end and separated by a predetermined circumferential clearance A. The segments 26 are normally formed of metal such as steel but may be formed of any suitable material having similar wear, strength, heat absorption and frictional rubbing characteristics. The radial outer portion of segment 26 is provided with circumferentially spaced apart, radially extending projections or ears 28 and 30 which define, in part, an intermediate recess 32 and end notches 34 and 36. The projections or ears 28 and 30 are provided with facing curved edges 38 and 40', respectively which, as shown, provide maximum circumferential dimension at the base of ears 28 and 30, respectively, for strength purposes in the direction of bearing load applied by key members 22.

End notch 34 of one segment 26 and the end notch 36 of an adjacent segment 26 cooperate to form a generally U-shaped recess 38 adapted to receive a mating U-shaped metal drive member 40 provided with key engaging slot 24. The slot 24 meshes with a key member 22 with sufficient clearance therebetween to permit sliding motion of drive member 40 along key member 22 without relative circumferential movement therebetween. As shown in FIG. 1, the drive member 40 is adapted to bear against radially extending side portions of recess 38 thereby holding adjacent segments 26 in spaced apart relationship as indicated by spacing A.

The drive members 40 are secured together in force transmitting relationship by spaced apart arcuate metal link or plate members 42 and 44 the opposite ends of which are provided with openings 46 and 48 which openings are aligned with spaced apart openings 50 and 52, respectively, in drive member 40. Suitable fastening means such as rivets 54 extend through aligned openings 46, 50 and 48, 52 to secure link members 42 and 44 to drive member 40 resulting in an annular retaining ring 56 from which the segments 26 depend. To that end, the ears 28 and 30 are provided with arcuate recesses 58 and 60 on opposite sides thereof which recesses are adapted to receive link members 42 and 44, respectively, and are suitably dimensioned to permit a limited amount of sliding or rocking movement of segment 26 relative to the associated link members 42 and 44 to prevent binding therebetween as a result of thermal expansion of the segment 26 and/or permit seating or drive member 40 against the entire bearing edge area of ear 28 or 30 depending upon the direction of rotation of the wheel, not shown.

The link members 42 and 44 are held in position within recesses 58 and 60 by a pair of circumferentially spaced apart bushings or spacing members 62 and 64 and associated fastening means such as rivets 66 and 68 which extend through suitable mating openings, not numbered, through link members 42 and 44 as well as spacing members 62 and 64, respectively. The bushings or spacing members 62 and 64 are located with sufficient circumferential spacing relative to curved edges 38 and 40', respectively, to avoid engagement thereof in the event of lateral shifting of the segment 26 relative to the link members 62 and 64.

If desired, the recesses 58 and 60 may be made straight instead of arcuate in which case the portions of link members 42 and 44 received by recesses 58 and 60 are made straight to conform to the recesses 58 and 60.

The radial inner peripheral edge portion of each segment 26 may be provided with a groove or channel 69 which, with segments 26 in annular formation, define a substantially continuous annular recess adapted to receive a flexible metal ring 70 which tends to hold the segments 26 in position in a common plane.

Figure 5:
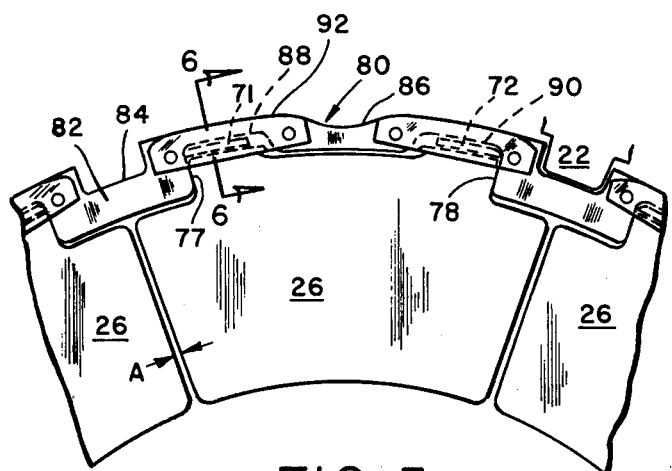
FIG. 5 is a plan view of a portion of an annular brake rotor friction disc embodying a modified form of the present invention.
Figure 6:
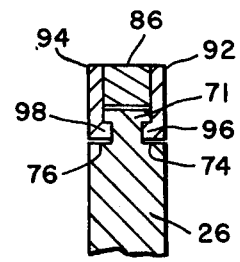
FIG. 6 is a section view taken on line 6—6 of FIG. 5.

Referring to FIGS. 5 and 6 which illustrate a second embodiment of the present invention structual elements similar to that of FIGS. 1, 2, 3 and 4 are identified by like numerals. The segments 26 are provided with circumferentially spaced apart radially outwardly extending projections or ears 71 and 72 the opposite side portions of which are recessed as at 74 and 76, respectively. The ears 71 and 72 are partially defined by notched portions 77 and 78, respectively, formed in the outer peripheral circumferential extremities of segment 26. A metal retaining ring 80 which may be formed as a one-piece continuous member is partially defined by circumferentially spaced apart drive members 82 provided with slots 84 which are adapted to engage key members 22. Each drive member 82 is received by an associated notched portion 77 of one segment 26 and a notched portion 78 of an adjacent segment 26 and bears against ears 71 and 72 defined thereby depending upon the direction of rotation of the wheel, not shown, to be braked. The drive members 82 are connected by intermediate arcuate sections 86 which are recessed as at 88 and 90 to receive ears 71 and 72, respectively. Side plates 92 and 94 fixedly secured to opposite sides of drive member 82 and section 86 extending therefrom extend radially inwardly to overlap ear 71. The side plates 92 and 94 are provided with facing flanged portions 96 and 98, respectively, which are adapted to mate with associated recesses 74 and 76 in ear 71. Likewise, the ear 72 is overlapped by an associated pair of side plates 92 and 94 which include flanged portions 96 and 98 engaged with recesses 74 and 76 in ear 72. It will be understood that sufficient clearance is provided between flanged portions 96 and 98 and recesses 74 and 76, respectively, to permit angular shifting of segments 26 relative to ring 80 to compensate for expansion of the segments 26 when heated during braking action.

Referring to FIG. 6, it will be noted that the combined axial thickness of ring 80 and side plates 92 and 94 is preferably equal to the axial thickness of segment 26 at the swept portion thereof.

Figure 7:
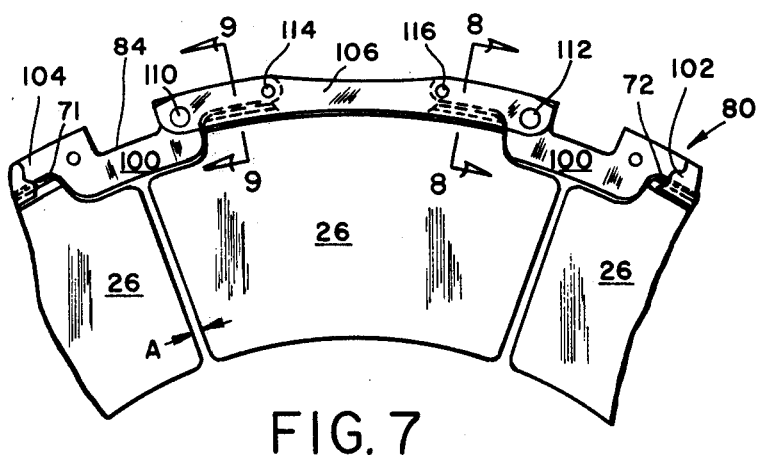
FIG. 7 is a plan view of a portion of an annular brake rotor friction disc embodying a second modified form of the present invention.
Figure 8:
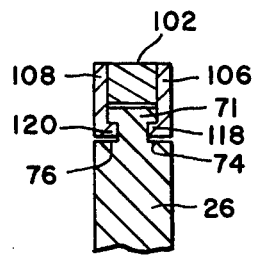
FIG. 8 is a section view taken on line 8—8 of FIG. 7.
Figure 9:
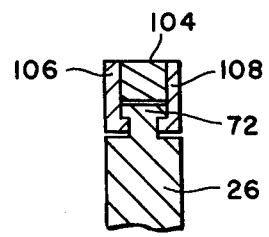
FIG. 9 is a section view taken on line 9—9 of FIG. 7.

Referring to FIGS. 7, 8 and 9 the segments 26 are substantially identical to those of FIG. 5 and are numbered accordingly. The significant difference is in the ring 80 which, instead of being continuous, is formed of a plurality of segments. To that end, ring 80 includes a plurality of circumferentially spaced apart drive members 100 provided with slots 84 and circumferentially oppositely extending arms 102 and 104. The drive members 100 are connected in spaced apart formation by a plurality of pairs of arcuate metal side plates or straps 106 amd 108 each pair of which connects adjacent drive members 100. The plates or straps 106 and 108 bear against opposite sides of arms 102 and 104 and are fixedly secured to drive members 100 by suitable fastening means such as rivets 110 and 112 extending through mating openings in straps 106 and 108 as well as drive members 100. Additional rivets 114 and 116 intermediate rivets 110 and 112 extend through mating openings in straps 106 and 108 and arms 102 and 104, respectively, to thereby rigidly secure the drive members 100 in position. As in the case of FIG. 5, ears 71 and 72 are each provided with recesses 74 and 76. Facing flanged portions 118 and 120 on straps 106 and 108, respectively, mate with recesses 74 and 76 of ear 71 while similar flanged portions 118 and 120 mate with recesses 74 and 76 of ear 72.

Referring to FIGS. 1, 5 and 7, it will be noted that the segments 26 are suspended from the respective annular retaining ring members radially outwardly therefrom which ring members retain the segments 26 in annular formation against centrifugal force generated during rotation of the rotor disc 20. The limited sliding movement of segments 26 relative to the retaining ring provided by the ears 28, 30 or 71, 72 allows the segments 26 to shift laterally into position against the drive members 40 and 82 under the frictional forces imposed on the segments 26 during braking operation. Also, the arcuate segments 26 may expand radially and circumferentially without undue binding against the retaining ring member connected thereto or without engagement of the circumferentially spaced edges of one segment 26 with adjacent segments 26 thereby minimizing distortion of the rotor disc 20.

Various structural modifications or changes may be made in the above described friction discs as will be recognized by those persons skilled in the disc brake art without departing from the scope of applicant's invention as defined by the following claims.

I claim:

1. A friction disc comprising:
 a plurality of arcuate segments arranged in end to end formation to define in part a substantially continuous annular friction member having opposite frictionally swept friction surfaces; and
 an annular retaining ring including circumferentially spaced apart drive means positioned radially outwardly from said annular friction member;
 each of said segments having circumferentially spaced apart projections extending radially outwardly from said annular friction member slidably connected to said annular retaining ring for limited circumferential movement relative thereto in the plane of said annular friction member;
 said annular retaining ring including axially spaced apart first and second plate members positioned radially outwardly from said annular friction member;
 said segment projections extending radially outwardly between the plate members and having circumferentially extending recesses for receiving said plate members such that said segments depend therefrom;
 said first and second plate members being fixedly secured at opposite end portions to adjacent drive means.

2. The friction disc of claim 1 in which said axially spaced apart first and second plate members including spacing members circumferentially intermediate said projections, said spacing members cooperating with the plate members to retain the same within the projection recesses.

3. The friction disc of claim 1 in which said spaced apart drive means comprises a plurality of U-shalped drive members interposed between adjacent segments, said U-shaped drive members engaging said adjacent segments to position the same in spaced relation to each other.

4. The friction disc of claim 1 in which said segment projections extend radially outwardly of the plate members.

* * * * *